United States Patent
Tonelli et al.

(10) Patent No.: US 9,282,850 B2
(45) Date of Patent: Mar. 15, 2016

(54) COFFEE MACHINE

(75) Inventors: Stefano Tonelli, Gaggio Montano (IT); Cristiano Castelli, Porretta Terme (IT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 784 days.

(21) Appl. No.: 13/508,740

(22) PCT Filed: Nov. 19, 2010

(86) PCT No.: PCT/IB2010/055306
§ 371 (c)(1),
(2), (4) Date: Aug. 15, 2012

(87) PCT Pub. No.: WO2011/064702
PCT Pub. Date: Jun. 3, 2011

(65) Prior Publication Data
US 2012/0297989 A1 Nov. 29, 2012

(30) Foreign Application Priority Data
Nov. 25, 2009 (IT) .................................. FI2009A0248

(51) Int. Cl.
*A47J 31/46* (2006.01)
*A47J 31/44* (2006.01)

(52) U.S. Cl.
CPC .......... *A47J 31/4485* (2013.01); *A47J 31/4489* (2013.01); *A47J 31/4496* (2013.01)

(58) Field of Classification Search
CPC A47J 31/4485; A47J 31/4489; A47J 31/4496
USPC ....................................... 99/293, 323.1, 453
See application file for complete search history.

(56) References Cited

U.S. PATENT DOCUMENTS

| | | | |
|---|---|---|---|
| 5,473,973 A | 12/1995 | Cortese | |
| 5,628,239 A * | 5/1997 | Wu | ................................. 99/290 |
| 6,289,796 B1 | 9/2001 | Fung | |
| 6,711,987 B2 | 3/2004 | Yoakim et al. | |
| 7,946,219 B2 * | 5/2011 | Marconi | ....................... 99/323.1 |

FOREIGN PATENT DOCUMENTS

| | | |
|---|---|---|
| DE | 102007040306 A1 | 2/2009 |
| EP | 1491120 A1 | 12/2004 |
| EP | 2080458 A1 | 7/2009 |
| FR | 2879426 A1 | 6/2006 |
| GB | 2311332 A | 9/1997 |
| WO | 2005102126 A2 | 11/2005 |
| WO | 2006122916 A1 | 11/2006 |
| WO | 2010044116 A2 | 4/2010 |

* cited by examiner

*Primary Examiner* — Reginald L Alexander (57) ABSTRACT

A coffee machine includes a coffee supply module, a support surface for a cup placed beneath the coffee supply module and a steam supply nozzle. The steam supply nozzle can be connected to a milk container which is equipped with an emulsifying module. The emulsifying module has a connection seat in which the steam supply nozzle is inserted when the milk container is connected to the steam supply nozzle. Further, the emulsifying module has a pipe for sucking up milk from the milk container and a nozzle for supplying hot or emulsified milk to the cup. The steam supply nozzle is oriented toward the support surface and the connection seat of the milk container is oriented upwardly when the milk container is placed on the support surface with the steam supply nozzle inserted in the connection seat.

16 Claims, 9 Drawing Sheets

COFFEE MACHINE

TECHNICAL BACKGROUND

The present invention relates to improvements to coffee machines, in particular but not exclusively, to automatic or semiautomatic coffee machines for domestic use. More particularly, the present invention relates to improvements to coffee machines equipped with means or devices for the production of milk-based beverages, such as latte macchiatos, cappuccinos or the like.

PRIOR ART

Various automatic and semiautomatic machines have been produced, in particular for domestic use, equipped with devices for the production of hot milk or emulsified milk and used to prepare milk-based beverages, such as cappuccinos, latte macchiatos, etc. WO2006/122916 discloses a coffee machine equipped with an island forming a base for connection to a pitcher inside which a steam intake pipe extends from the base to the top. An emulsifier is housed in the cover of the pitcher and, thanks to the intake of steam coming from the machine, sucks up the milk from the container and heats it or emulsifies it with air sucked in from the outside environment to produce milk froth.

U.S. Pat. No. 6,711,987 discloses a coffee machine equipped with a milk container that can be connected to a steam nozzle connected to the coffee machine. The container is equipped with a steam intake tube for emulsifying the milk inside the container. In some embodiments a system is also disclosed having an external supply nozzle that makes it possible to supply the emulsified milk to a cup together with the coffee.

GB-A-2311332 discloses a similar arrangement having a coffee machine equipped with an external milk tank that can be connected to a horizontal nozzle carried by the machine that supplies steam in order to suck up the milk from the container, emulsify it and deposit it in a mug via a supply nozzle.

A similar system is disclosed in U.S. Pat. No. 5,473,973.

WO-A-2005/102126 discloses a coffee machine having the same arrangement of a pitcher for supplying emulsified milk as described in the above publications. This device is characterised by specific scraping means for removing encrusted milk from the supply pipes leading to the emulsifier.

A coffee machine having an emulsification system for milk coming from a pitcher is disclosed in the copending international application PCT/IT2009/000378 (corresponding to Italian application FI2008A000198), the content of which forms an integral part of the present invention.

SUMMARY OF THE INVENTION

The present invention proposes providing a coffee machine having means for producing hot or emulsified milk, comprising a particularly effective and safe system for connecting the milk container or pitcher to the steam supply nozzle mounted on the machine.

In one embodiment the machine according to the invention basically comprises:
- at least a coffee supply module;
- a support surface for cups, arranged beneath said coffee supply module;
- at least a first steam supply nozzle, to which a milk container can be connected, equipped with an emulsifying module having a connection seat in which said first steam supply nozzle is inserted when the container is connected to said first steam supply nozzle, said emulsifying module comprising a pipe for sucking up milk from said container and a nozzle for supplying hot or emulsified milk.

The steam supply nozzle is oriented toward the support surface and the connection seat in the milk container is oriented upwardly when the container is placed on the support surface with the steam supply nozzle inserted into said connection seat.

Further characteristic advantages and embodiments of the invention are described in the accompanying claims, which form an integral part of the present description.

In a preferred embodiment the coffee machine comprises a second nozzle carried by said machine that can be connected in a second connection seat of said emulsifying module for the admittance of hot water and/or steam for washing. This greatly improves the functionality of the machine.

BRIEF DESCRIPTION OF THE DRAWINGS

The invention will better understood on reading the description, given with reference to the set of drawings illustrating a non-limiting practical embodiment of the invention and, more particularly, in which.

DETAILED DESCRIPTION OF AN EMBODIMENT OF THE INVENTION

Figure 1:
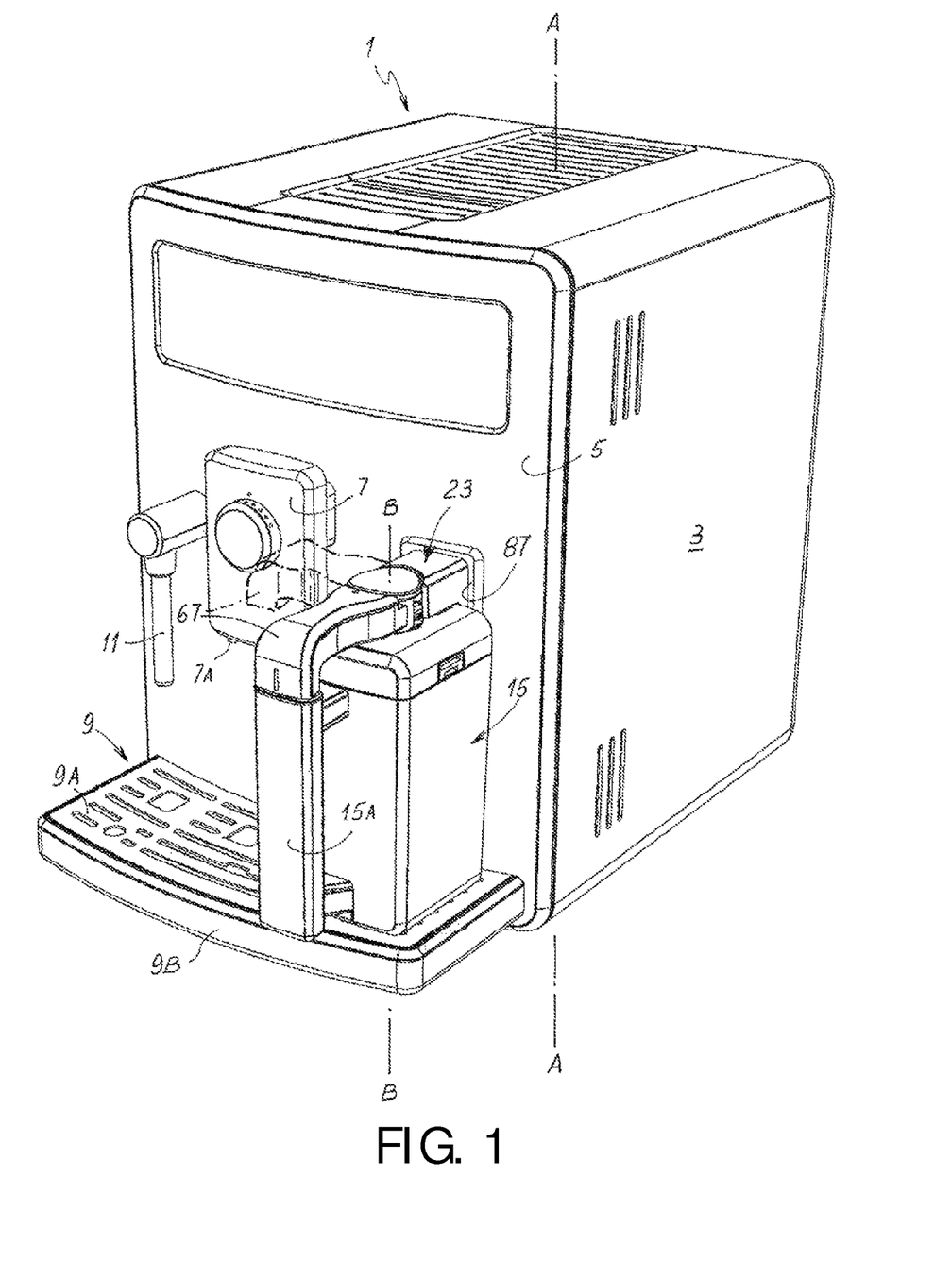
FIG. 1 is an axonometric view of one possible embodiment of a machine according to the invention, with the milk container or pitcher connected to the machine.

FIG. 1 shows a complete, axonometric view of a coffee machine 1, in which the invention is incorporated. The coffee machine 1 is shown by way of example, it being understood that forms and features other than those illustrated are also possible.

The machine 1 comprises a body 3 in which the main components of the machine are housed, and in particular, for example, the coffee supply module, one or more boilers, one or more pumps for feeding water from a water tank housed in the upper region of the machine, an optional powdered or granulated coffee tank, a coffee grinder (if the coffee tank is provided so as to contain coffee beans), electric and hydraulic circuits for operation of the machine, a programmable electronic control unit, etc. These parts are known per se and will not be described here in greater detail.

The body 3 of the machine 1 is equipped with a front door 5 that can be opened by an oscillating movement about a vertical hinge axis A-A, for example so as to access the brewing module for producing coffee housed behind the door 5. A module 7 for supplying coffee is arranged on the door 5 and may comprise, for example, two coffee supply nozzles 7A (see also FIG. 2A). One or two coffee containers, for example mugs and cups, may be positioned beneath these nozzles 7A and are supported on a support surface 9 below. The surface 9 is advantageously formed by a grate 9A arranged above a reservoir 9B for collecting refluent liquids, for example water for washing the coffee supply module or the device for emulsifying the milk, as described in greater detail hereinafter. The reservoir 9B and the grate 9A may be removed in order to empty the reservoir and wash it.

A steam nozzle, denoted by reference numeral 11, may also be provided on the door 5 of the machine, that is to say a steam supplier that may be used to supply steam and/or hot water to a mug or to a pitcher (for the production of tea), or else to manually emulsify milk contained in said mug or pitcher in a conventional manner.

The door 5 also has a first nozzle 13 for supplying steam in order to heat and/or emulsify milk, as well as a second nozzle 14 for supplying steam or hot water for washing or, alternatively, emulsifying air to an emulsifying device carried by a removable pitcher, as described below. The two nozzles 13 and 14 can be seen, in particular, in the sectional view in FIG. 2, in the view of FIG. 2A and individually in the sectional views of FIGS. 3 and 4.

Figures 2, 3:
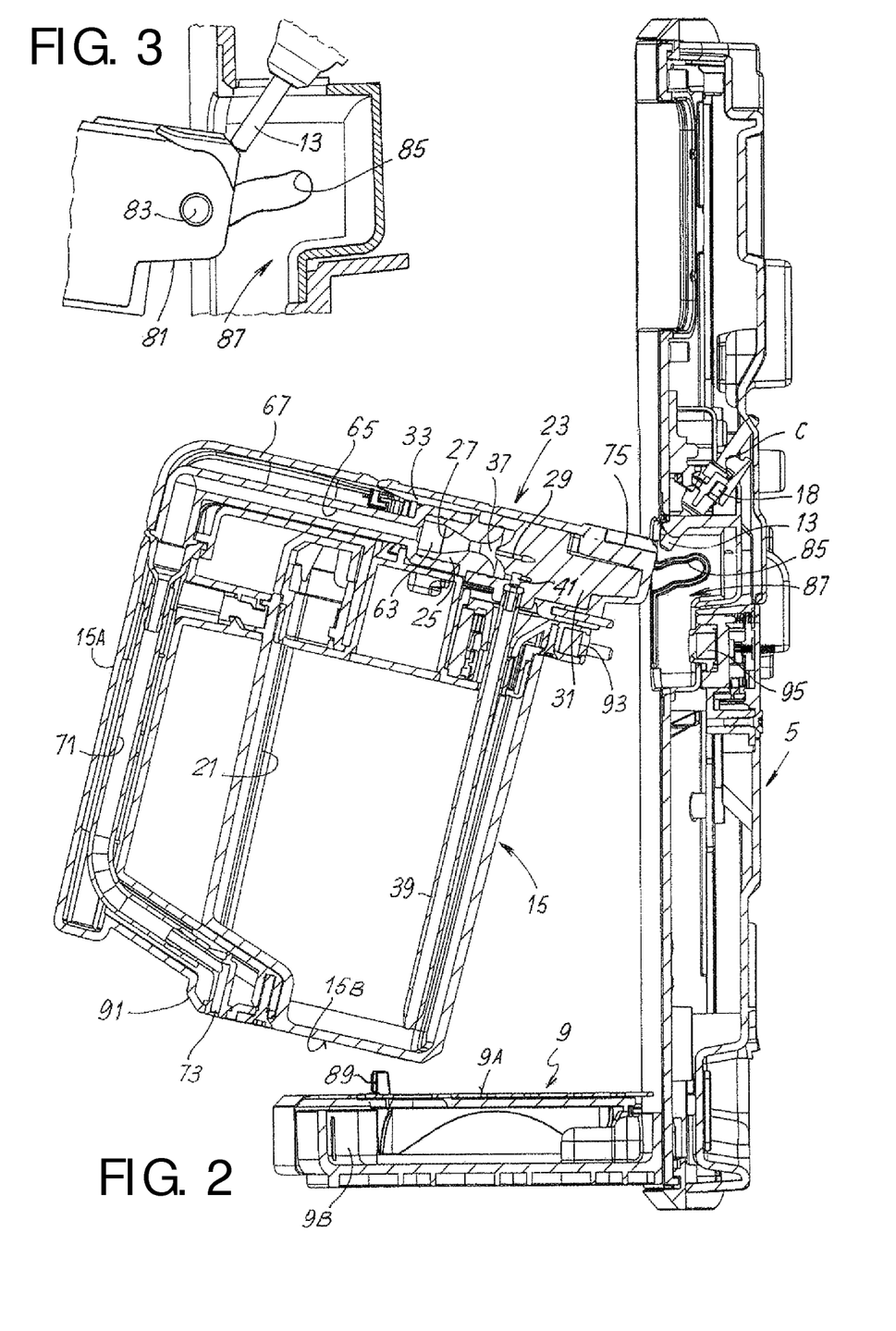
FIG. 2 is a sectional view along a vertical plane of the door of the machine of FIG. 1 and of the milk container or pitcher fitted to the water, steam and air supply nozzles mounted on the machine door.
FIG. 3 is an enlarged view of the connection region.
Figure 2A:
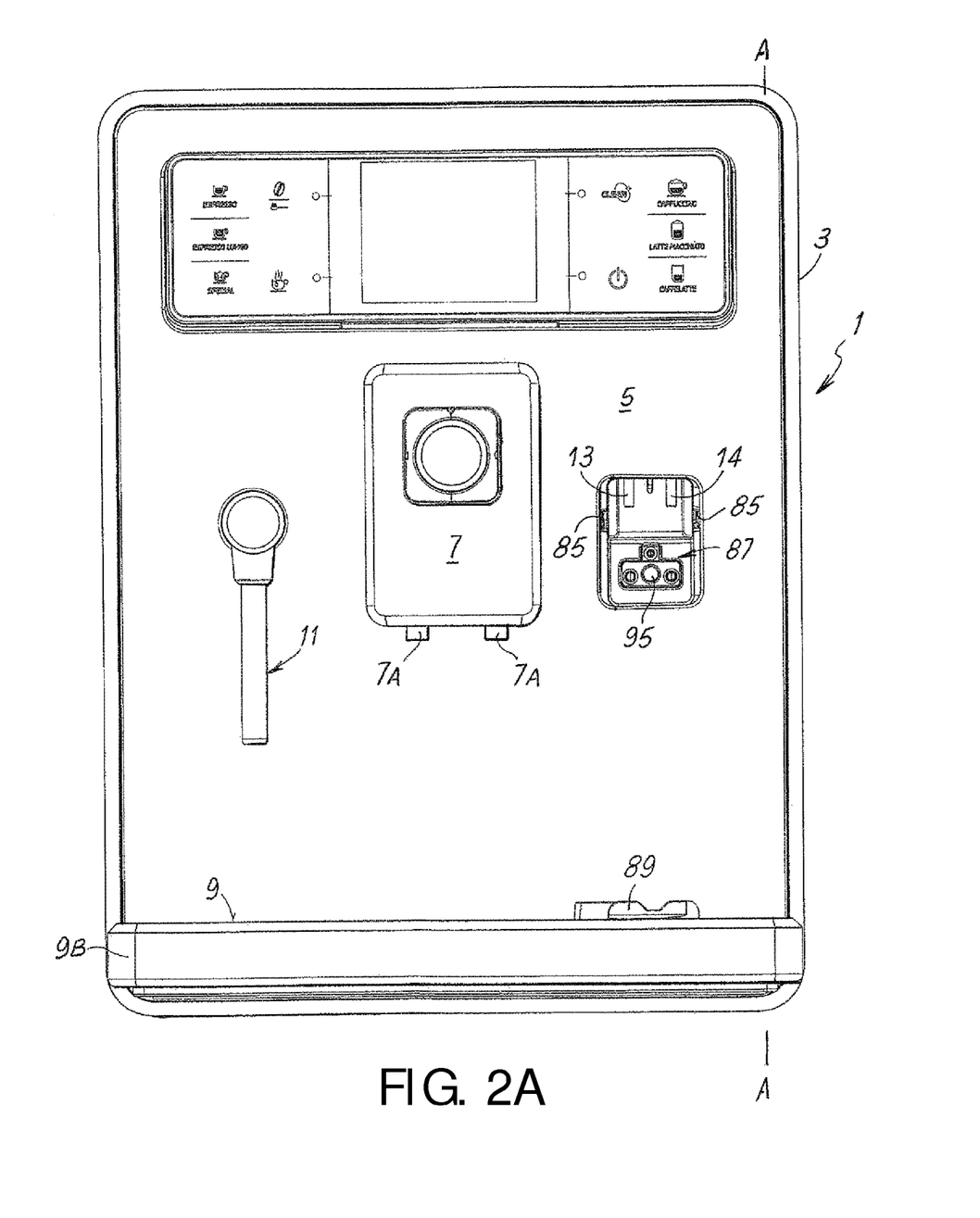
FIG. 2A is a font view of the machine of FIG. 1 without the milk pitcher or container.

The supply nozzles 13 and 14 may be connected to an emulsifying module denoted as a whole by reference numeral 12 (FIGS. 4, 5 and 6) and carried by a container or pitcher 15, the main parts of which will be described hereinafter with specific reference to FIGS. 2 and 3. The supply nozzles 13 and 14 may be oriented in a vertical direction or (preferably and as shown in FIG. 2) at an angle preferably less than 45° relative to the vertical and oriented toward the support surface 9.

The container or pitcher 15 comprises a body 21 that is filled with milk to be heated or emulsified by the steam supplied via the steam supply nozzle 13. The body 21 of the container 15 is closed by a cover denoted, as a whole, by reference numeral 23 and inside which the above-mentioned emulsifying module 12 is housed. Said emulsifying module may be formed in any known manner. In some embodiments the emulsifying module 12 comprises a body 25 that forms a Venturi tube 27 fed by steam supplied from the steam supply nozzle 13 via an injector nozzle 29 formed in a body 31 coupled to the body 25 and arranged coaxially thereto inside a housing 33 formed in the cover 23 of the container 15. The various parts described so far may be disassembled for easier cleaning. In particular, the bodies 31 and 25 may be uncoupled to allow more comprehensive internal cleaning once they have been removed from the cover 23 of the container or pitcher 15.

As can be seen, in particular in the sectional view of FIG. 4, in some embodiments the injector nozzle 29 is coaxial with the Venturi tube 27 and forms, together with the inlet region of said Venturi tube 27, a suction chamber 37 for the milk, optionally emulsified, in the manner described below. As can be seen, in particular, by comparing FIGS. 4 and 6, the nozzle 29 is in fluid connection with the steam supply nozzle 13 carried by the door 5 of the machine 1 via a pipe 29A. The pipe 29A preferably has a cross-section that decreases gradually from an end beside the steam supply nozzle 13 until it reaches a minimum dimension corresponding to that of the injector nozzle 29. At the end close to the nozzle 13 the pipe 29A has a substantially vertical portion 29B (when the container 15 is coupled to the machine 1 and is ready for use), in which the terminal end of the steam supply nozzle 13 is connected. The steam supply nozzle 13 is arranged substantially vertically when the container or pitcher 15 is connected to the machine 1, as shown in FIG. 1.

The substantially vertical portion 29B of the pipe 29A defines a tight coupling seat for the steam supply nozzle 13. Said nozzle or coupling seat formed by the vertical portion 29B has a sealing ring, for example formed by one or more O-rings.

The milk sucked up via a tube 39 extending toward the base of the body 21 of the container 15 is introduced into the suction chamber 37, in addition to the steam injected via the injector nozzle 29. The tube 39 leads into an emulsifying chamber 41 formed in the body 31, into which air coming from the nozzle 14 carried by the door 5 may be fed. As can be seen, in particular in FIGS. 5 and 6, the emulsifying chamber 41 is connected to the nozzle 14 that introduces air via a pipe 42. In some embodiments the pipe 42 has a variable cross-section that decreases from the connection point to the nozzle 14 as far as the emulsifying chamber 41. In some embodiments the pipe 42 terminates with a substantially vertical portion 42A, similarly to the portion 29B of the pipe 29A that forms a connecting and sealing seat in the distal end of the air feed nozzle 14. Seals produced by one or more O-rings may be formed in the seat 42A or at the distal end of the air feed nozzle 14.

During operation, in order to obtain emulsified milk, the steam introduced via the supply nozzle 13 and the nozzle 29 in the Venturi tube 27 creates low pressure by the Venturi effect in the suction chamber 37. Milk that has been emulsified beforehand at low temperature in the emulsifying chamber 41 is also sucked into this suction chamber 37. The milk is emulsified at low temperature by being mixed with the air supplied by the nozzle 14 thanks to the fact that the milk and air are mixed before being contacted with hot steam.

The emulsified milk is then heated by being contacted with the steam in the Venturi tube 27, and in particular in a mixing chamber 63 downstream of the constriction in the Venturi tube 27 and the steam is condensed. The emulsified, heated milk flows through a flexible pipe 65 housed in a rigid body 67 hinged to the cover 23 of the container 15. This adjustable rigid body 67 can be rotated about a substantially vertical axis B-B (see FIG. 1) to adopt a resting position shown by an unbroken line in FIG. 1 and a supply position, shown by a dot-dash line in the same figure, in which it is oriented into a position beside that of the coffee supply module 7. The emulsified milk exiting the pipe 65 is thus supplied directly to the cup, glass or other container arranged on the surface 9 and positioned so as to receive the coffee supplied from the supply module 7.

When the pipe 65 is in the resting state (FIGS. 1 and 2), its outlet end is aligned with a handle 15A of the container 15, inside which a discharge pipe 71 that ends at one or more discharge holes 73 formed in the base 15B of the container 15 is formed. When the container is arranged on the surface 9, as shown in FIG. 1, it is thus possible to discharge washing water from the emulsifier through the pipe 65, the pipe 71 and the holes 73 in the reservoir 9B beneath the grate 9A and forming the support surface 9. This makes it possible to carry out working cycles of the emulsifier by introducing steam and/or hot water via the nozzle 14, or else via the nozzle 13, or simultaneously or else sequentially via both the nozzle 13 and the nozzle 14.

In this regard it should be noted that the nozzle 14 may feed both the emulsifying air and the steam or hot water for washing. This can be obtained by connecting the nozzle 14 to a valve system (not shown) controlled by the programmable central control unit of the machine 1, in such a way that the user can start one of a plurality of short washing, intense washing, emulsified milk supply or hot milk supply programmes, or the like. In particular, hot milk that has not been emulsified may be supplied by cutting off the air intake pipe connected to the nozzle 14.

Figures 4, 5, 6:
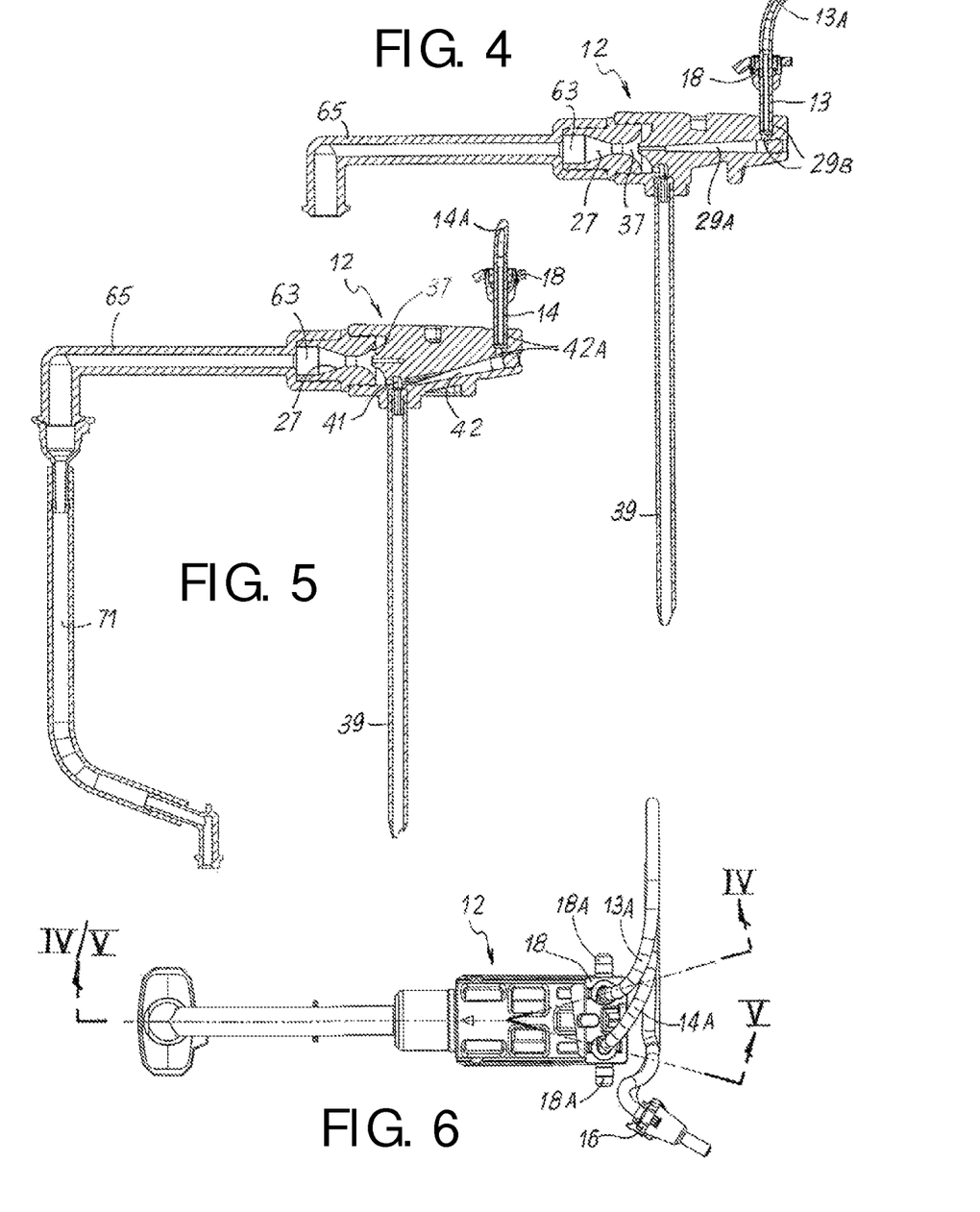
FIGS. 4 and 5 are sectional views along two different sectional planes of the emulsifying device connected to the two nozzles carried by the machine.
FIG. 6 is a plan view of the emulsifier, showing the planes IV-IV and V-V of the sectional views in FIGS. 4 and 5 and in which the pipes connecting the nozzles to a pair of connections carried by the body of the machine can also be seen.

FIGS. 4, 5 and 6 show schematic views of the flexible tubes 13A and 14A that connect the nozzles 13 and 14 to a rigid connection 16 mounted inside the body 3 of the machine and to which the valves for controlling the intake of hot water, steam and air through the pipes 13A, 14A and the relative nozzles 13 and 14 are connected. The flexible tubes 13A, 14A allow the door 5 to be opened and closed.

As can be seen, in particular in FIGS. 2 and 3, the steam supply nozzle 13 and the air or water supply nozzle 14 are mounted on the door 5 of the machine 1 at an incline in such a way that the jet of steam and/or the jet of water is oriented downwardly and toward the support surface 9. Maximum safety during use of the machine is thus ensured. In fact, even if steam or hot water is supplied accidentally from the nozzle 13 or from the nozzle 14 in the absence of a correctly connected container 15, the jet of steam or hot water is oriented in such a way that it will not injure the user and the water or condensate is collected by the reservoir 9B.

In some embodiments the steam supply nozzle 13 and the washing air or water feed nozzle 14 may be fixed. In the example shown however, they are mounted in a balanced manner about a horizontal axis C (FIG. 2) in such a way that connection to the emulsifying module 12 carried by the container 15 is facilitated via a movement described in greater detail below. In some embodiments the nozzles 13 and 14 are carried for this purpose by a support 18 hinged via pins 18A (see in particular FIG. 6) to the door 5.

As becomes clear by viewing FIG. 3, in which the container or pitcher 15 is shown in a position ready for connection to the machine 1, the movement of insertion and connection of the container 15 to the nozzles 13 and 14 of the machine 1 is a particularly ergonomic movement consisting of a combination of rotation and translation. In fact, it is easy for the user to carry out this movement and to avoid pushing horizontally on the machine 1, which is normally necessary when the container of milk is connected via a horizontal movement on a nozzle that is also oriented horizontally and carried at the front of the machine. In fact, in this instance the user applies a pushing force to overcome the friction exerted by the rings provided on the steam supply nozzle, which pushing force may also accidentally move the machine. Instead, in the innovative configuration of the present invention, the force necessary for connection of the nozzles 13 and 14 in the seats formed by the portions 29B and 42A of the pipes 29A and 42 of the emulsifying module 12 does not include any accidental movement of the machine 1, despite the friction that is exerted on the sealing rings.

Figure 7A:
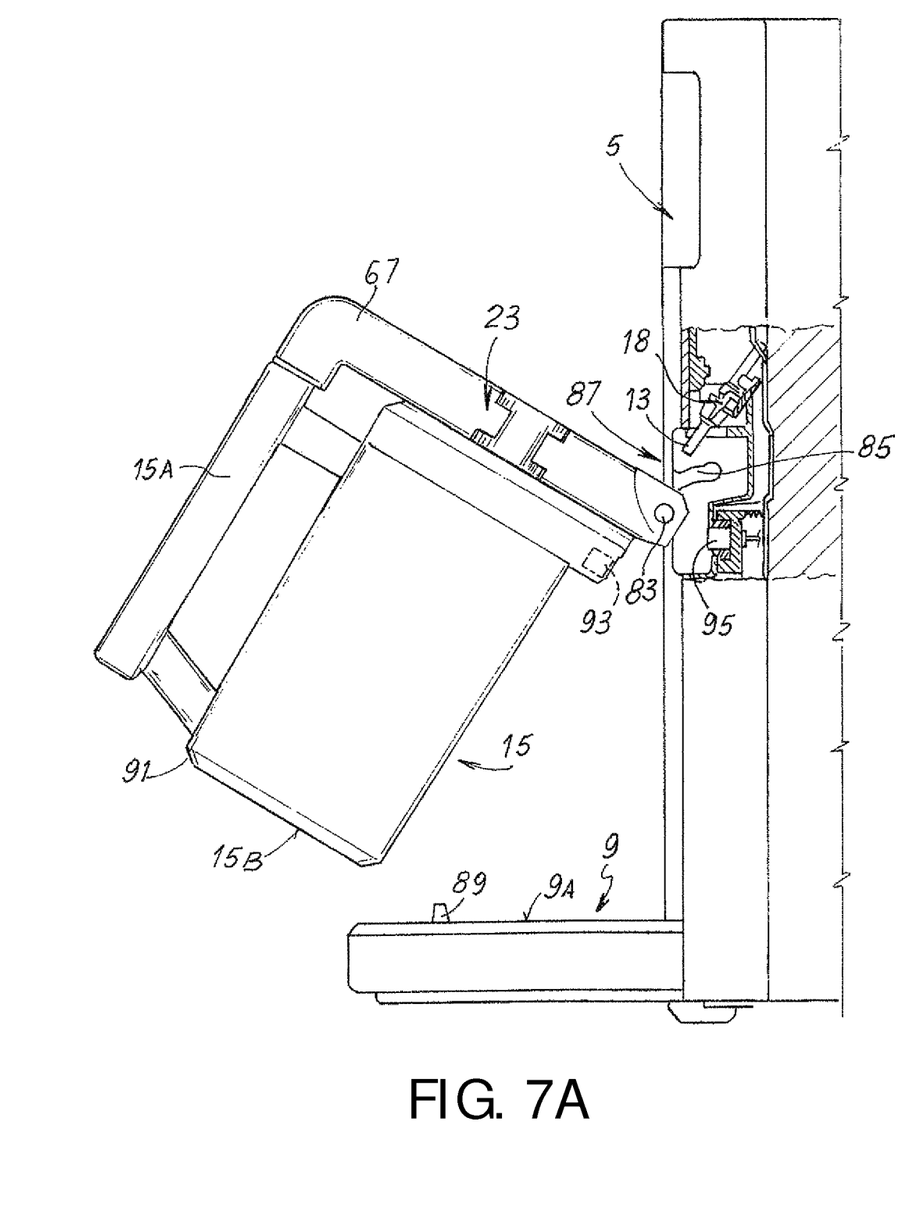
FIGS. 7A-7D show a sequence of movements for connecting the milk pitcher or container to the coffee machine.
Figure 7B:
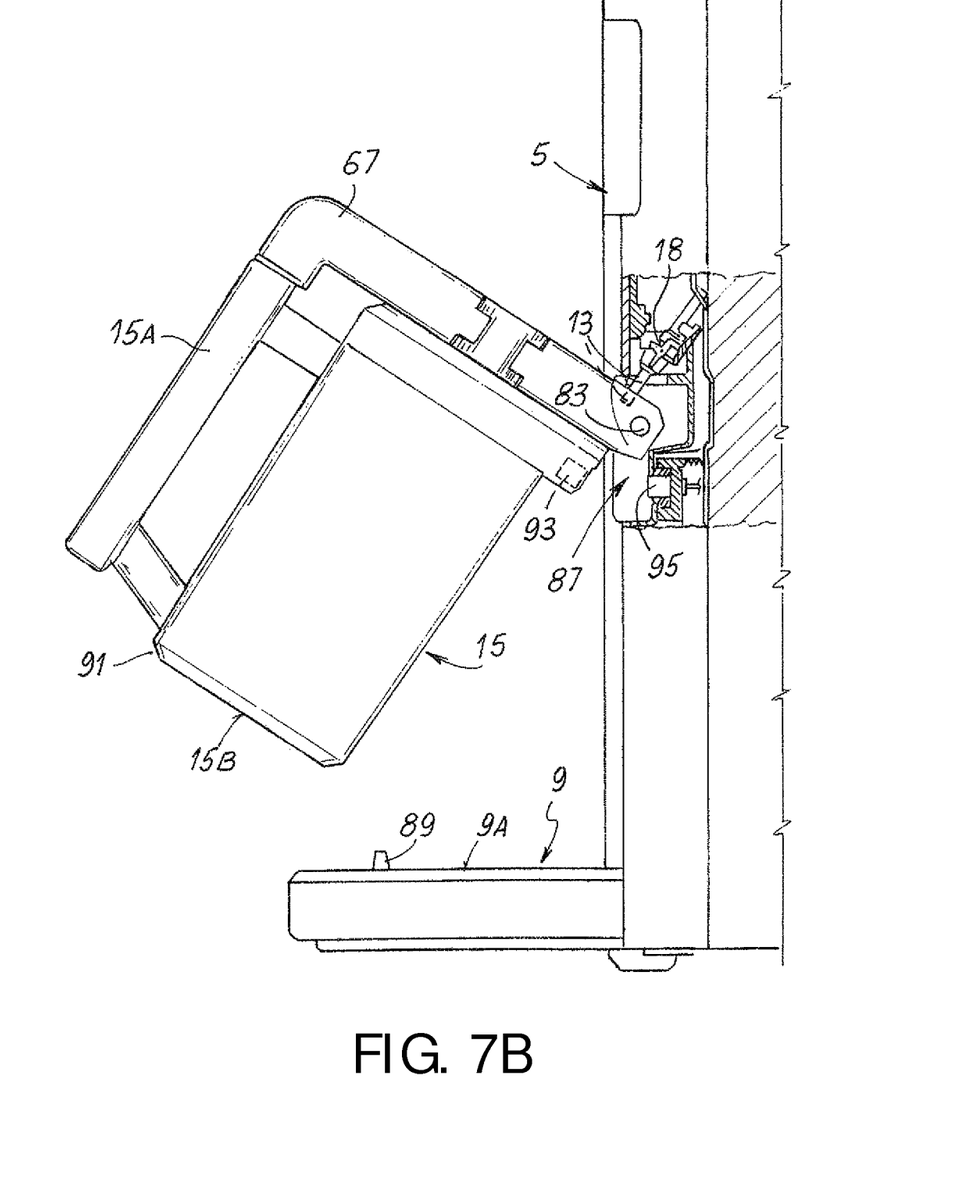
Figure 7C:
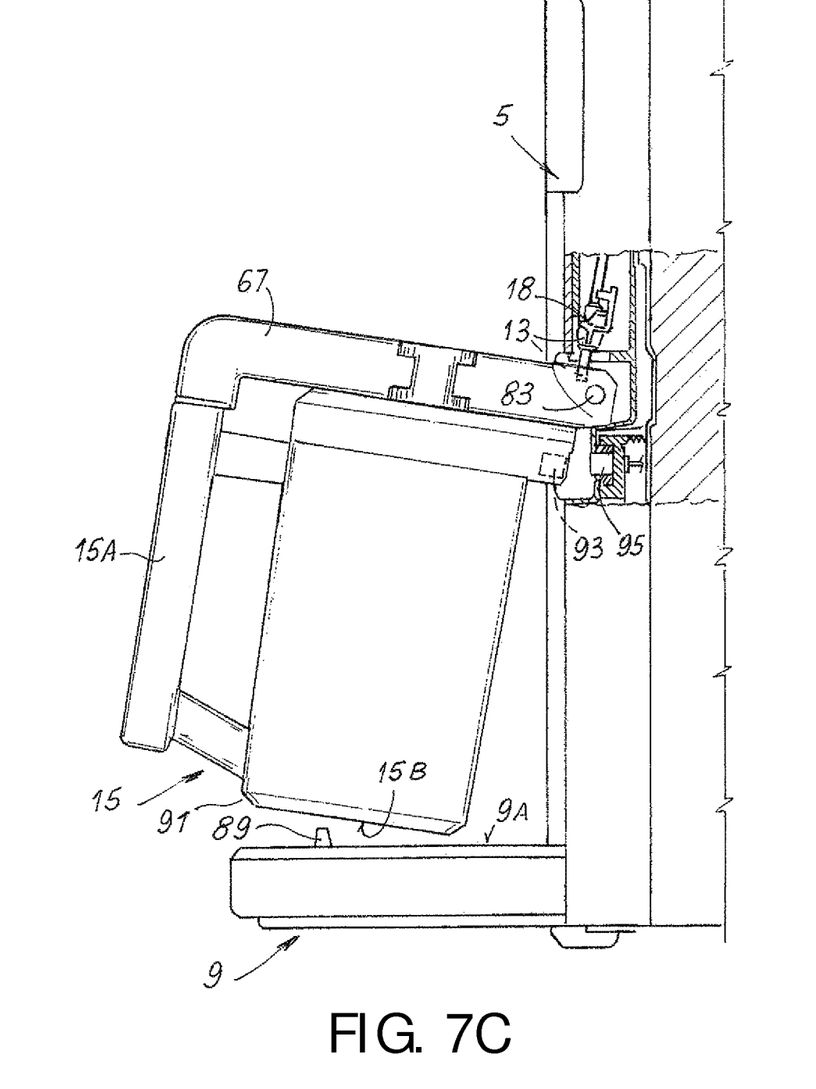
Figure 7D:
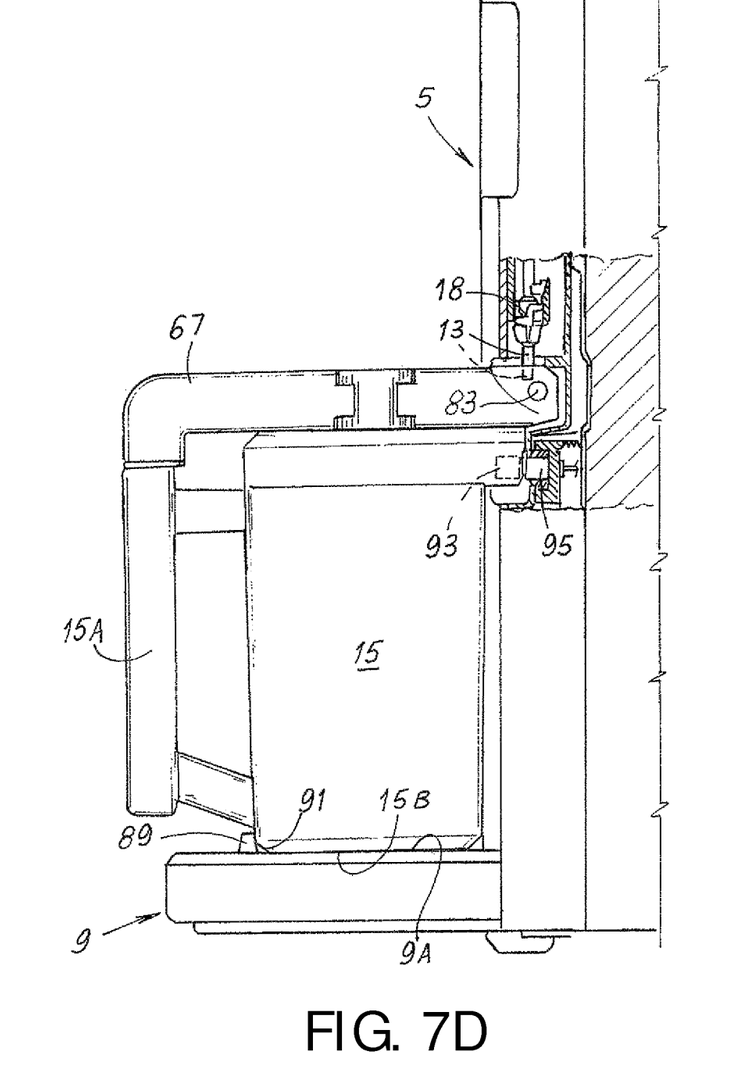

The sequence of FIGS. 7A-7D shoes the movement for connection of the pitcher or container to the machine. Disconnection is achieved by reversing the sequence. FIG. 7A shows the pitcher fitted to the machine in an inclined position and with the front part of the cover, where the connections for the nozzles 13 and 14 are arranged in the vicinity of the cavity 87. The guide pins 83 connect to the guides 85. Next (FIG. 7B), the pitcher is fitted further to the machine and then rotated (in an anti-clockwise direction in the drawing), as can be seen in FIG. 7C, with the consequent translation of the guide pins 83 along the guides 85 and the insertion of the nozzles 13, 14 in the corresponding upper holes in the emulsifier. The insertion and connection movement is completed (FIG. 7D) when the base of the container 15 rests on the grate beneath. This enables for a user-friendly connection of the container to the machine.

In some embodiments, in order to facilitate and guide the connection movement of the container 15, said container is equipped, on a portion 81 projecting from its cover 23 in which the seats 29B and 42A for connection of the nozzles 13 and 14 are formed, with lateral guide pins 83 that engage in two opposing corresponding guides 85 formed in a cavity 87 formed on the door 5 of the machine and into which the nozzles 13 and 14 project. As shown in the enlarged view of FIG. 3, when the container 15 is fitted to the machine via an inclined direction of movement, the pins 83 engage in the guides 85 and the successive rotary-translatory movement for fitting the pitcher or container 15 to the machine 1 is guided with the aid of the interaction between pins 83 and guides 85.

Furthermore, in some preferred embodiments of the invention a catch or stop tooth 89 is provided on the surface 9 and is arranged at a distance from the door 5 of the machine 1 in such a way that the container 15 is disposed, when correctly connected to the machine 1, with its base 15B resting on the surface 9 in the region between the door 5 and the stop tooth 89. On the one hand, this tooth stabilises the container 15 and, on the other hand, prevents the user from removing the container 15 via a horizontal movement that could damage the nozzles 13, 14 oriented downwardly and inserted into the seats 29B and 42A in the emulsifying module 12.

In fact, the tooth 89 forces a removing movement of the container 15, i.e. a movement of detachment from the machine 1, that is the reverse of the connection movement and is effected via an initial upwards rotation and a subsequent removal from the steam supply nozzle 13. The connection and disconnection movements may be facilitated by a rounded portion 91 formed in the vicinity of the base 15B of the container 15.

For greater stabilisation of the container 15 in the connected position, a pair of magnets 93, 95 (FIG. 2) may be provided, one of which is fixed to the container 15 and the other of which is fixed to the door 5 of the machine, at the seat 87.

Figure 8:
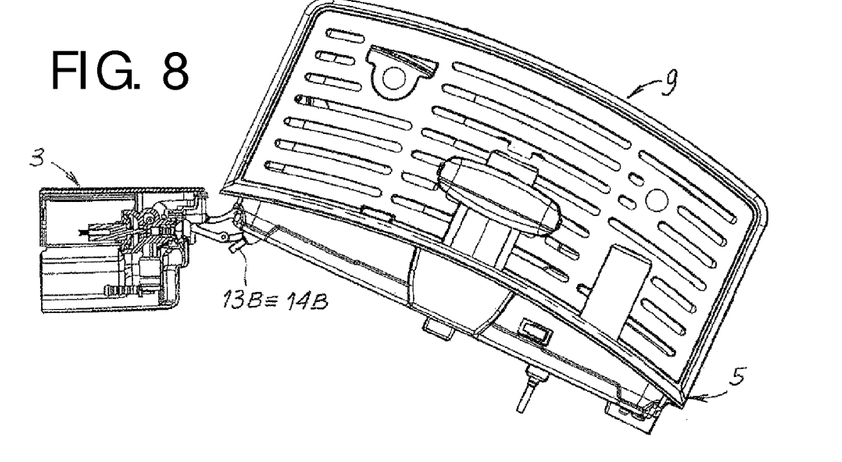
FIG. 8 is a plan view of the door of the machine in an open position, with a view of the region hinged to the body of the machine.
Figure 9A:
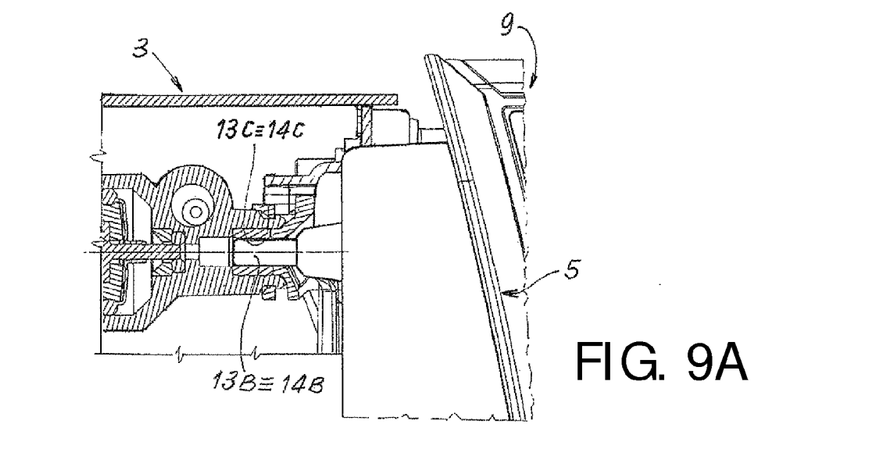
FIGS. 9A and 9B are enlarged views of the hinge region and of the connection region of the water, steam and air supply pipes from the inside of the machine to the nozzles arranged on the door.
Figure 9B:
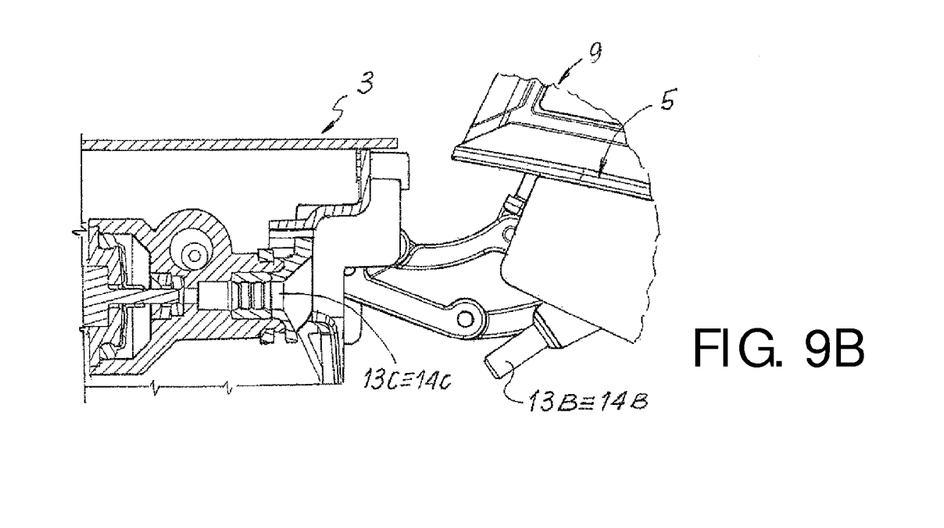

FIGS. 8, 9A and 9B show another advantageous feature of an embodiment of the machine according to the invention. These figures show the door 5 and its articulation to the body 3 of the machine. Connections 13B, 14B that form the ends of the flexible tubes 13A, 14A for feeding the nozzles 13 and 14 are provided on the door 5 of the machine. The connections 13B, 14B are actually superimposed in the plan view of FIGS. 8, 9A and 9B and therefore only one of them is visible. Connections of this type are made of relatively rigid plastics material and are arranged so as to be inserted into corresponding connections 13C, 14C fixed inside the body 5 of the machine, which are, in turn, in fluid connection with electronic control valves that open and close depending on the working cycle that the user wishes to carry out. When the door is closed (FIG. 9A), the connections 13B, 14B are inserted into the connections 13C, 14C in such a way that a fluid connection is formed between the nozzles 13, 14 and the internal valves of the machine. When the door is opened (FIG. 9B), the connectors or connections 13B, 14B and 13C, 14C separate from one another, opening the circuit. On the one hand, this makes it possible to prevent use of continuous flexible pipes that would be subject to dynamic stress as a result of frequent opening and closing of the door 5. On the other hand, the specific arrangement described makes it possible to provide the connections in the direct proximity of the hinge axis. Opening the water, air and steam circuits makes it possible to avoid the generation of low pressure in the pipes when the door 5 is opened.

The arrangement described above of the connections to the feed pipes of the nozzles 13, 14 also makes it possible to improve cleaning and to disassemble/assemble the door from/on the body of the machine in order to carry out any repairs/replacements, without having to disassemble/remove hydraulic connections.

It is understood that the drawings merely show an example given only as a practical demonstration of the invention, which can be varied in form and arrangement without departing from the scope of the concept on which the invention is based. The optional inclusion of reference numerals in the accompanying claims is aimed at facilitating reading of the claims with reference to the description and the drawings, and does not limit the scope of protection represented by the claims.

The invention claimed is:

1. A coffee machine comprising:
a coffee supply module;
a support surface for a cup, said support surface being arranged beneath said coffee supply module; and
a first steam supply nozzle, said first steam supply nozzle being connectable to a milk container that is equipped with an emulsifying module, the emulsifying module having a first connection seat in which said first steam supply nozzle is inserted when the milk container is connected to said first steam supply nozzle,
wherein said emulsifying module comprises a pipe for sucking up milk from said milk container; and a milk supply nozzle for supplying hot and/or emulsified milk,
wherein said first steam supply nozzle is oriented toward said support surface,
wherein said first connection seat is oriented upwardly away from said support surface when the milk container is placed on said support surface with said first steam supply nozzle inserted into said first connection seat, and
wherein the coffee machine further comprises a second steam supply nozzle, said second steam supply nozzle being connectable to a second connection seat of said emulsifying module for supplying hot water and/or steam for washing.

2. The coffee machine according to claim 1, wherein a distance between said first steam supply nozzle and the support surface, and a distance between said first connection seat and a base of the milk container are such that insertion of said first steam supply nozzle in said connection seat requires a rotary-translatory movement of the milk container.

3. The coffee machine according to claim 1, wherein said milk supply nozzle of the milk container is positioned in a supply position beside said coffee supply module, wherein the supply position beside said coffee supply module allows for the milk supplied to the milk supply nozzle and coffee supplied by the coffee supply module to be poured into the cup arranged on the support surface without changing a position of said cup on the support surface.

4. The coffee machine according to claim 3, wherein said milk supply nozzle can be positioned in a washing position that is different than the supply position.

5. The coffee machine according to claim 1, wherein said first steam supply nozzle is mounted to the coffee machine in an oscillating manner to facilitate insertion of the first steam supply nozzle in the first connection seat.

6. The coffee machine according to claim 1, wherein said support surface is equipped with a member for locking the milk container in place when said milk container is connected to the first steam supply nozzle.

7. The coffee machine according to claim 1, wherein said first steam supply nozzle can be inserted into said first connection seat via a reciprocal approaching movement between the milk container and the first steam supply nozzle, and wherein said milk container can be positioned on said support surface by a rotational movement of the milk container and of the first steam supply nozzle.

8. The coffee machine according to claim 1, wherein said second steam supply nozzle is connected to an emulsifying air inlet.

9. The coffee machine according to claim 1, wherein said first steam supply nozzle and said second steam supply nozzle are substantially parallel to one another.

10. The coffee machine according to claim 1, wherein said first steam supply nozzle and said second steam supply nozzle are carried by a common oscillating support.

11. The coffee machine according to claim 1, wherein said second steam supply nozzle is mounted on a door of the coffee machine.

12. The coffee machine according to claim 1, wherein said first steam supply nozzle can be connected to a connection inside the coffee machine by a connection mounted on a door of the coffee machine when the door is closed, and wherein an opening of the door opens a hydraulic connection circuit by disconnecting said first steam supply nozzle from the connection inside the coffee machine.

13. A coffee machine comprising:
a coffee supply module;
a support surface for a cup, said support surface being arranged beneath said coffee supply module; and
a first steam supply nozzle, said first steam supply nozzle being connectable to a milk container that is equipped with an emulsifying module, the emulsifying module having a first connection seat in which said first steam supply nozzle is inserted when the milk container is connected to said first steam supply nozzle,
wherein said emulsifying module comprises a pipe for sucking up milk from said milk container; and a milk supply nozzle for supplying hot and/or emulsified milk,
wherein said first steam supply nozzle is oriented toward said support surface,
wherein said first connection seat is oriented upwardly away from said support surface when the milk container is placed on said support surface with said first steam supply nozzle inserted into said first connection seat,
wherein the milk supply nozzle of the milk container can be positioned in a washing position that is different than a supply position, and
wherein in said washing position the milk supply nozzle is in a fluid connection with a discharge pipe extending inside a handle of the milk container, said discharge pipe having an exit opening beside a base of the milk container.

14. A coffee machine comprising:
a coffee supply module;
a support surface for a cup, said support surface being arranged beneath said coffee supply module;
a steam supply nozzle, said steam supply nozzle being connectable to a milk container that is equipped with an emulsifying module, the emulsifying module having a connection seat in which said steam supply nozzle is inserted when the milk container is connected to said steam supply nozzle; and a guide system for guiding the milk container relative to said steam supply nozzle, wherein said emulsifying module comprises a pipe for sucking up milk from said milk container; and a milk supply nozzle for supplying hot and/or emulsified milk, wherein said steam supply nozzle is oriented toward said support surface, wherein said connection seat is oriented upwardly away from said support surface when the milk container is placed on said support surface with said steam supply nozzle inserted into said connection seat, and wherein said guide system comprises two guide profiles beside said first steam supply nozzle, with which two restraining members, integral with the connection seat in the emulsifying module of the milk container, cooperate.

15. A coffee machine comprising:

a coffee supply module;

a support surface for a cup, said support surface being arranged beneath said coffee supply module; and a steam supply nozzle, said steam supply nozzle being connectable to a milk container that is equipped with an emulsifying module, the emulsifying module having a connection seat in which said steam supply nozzle is inserted when the milk container is connected to said steam supply nozzle, wherein said emulsifying module comprises a pipe for sucking up milk from said milk container; and a milk supply nozzle for supplying hot and/or emulsified milk, wherein said steam supply nozzle is oriented toward said support surface, wherein said connection seat is oriented upwardly away from said support surface when the milk container is placed on said support surface with said steam supply nozzle inserted into said connection seat, and wherein said steam supply nozzle is mounted on a door of the coffee machine.

16. The coffee machine according to claim 15, wherein said door and said support surface are integrally arranged to allow the door to be opened while the milk container is connected to said first steam supply nozzle and while the milk container is resting on said support surface.

* * * * *